(12) United States Patent
Bremer et al.

(10) Patent No.: US 11,233,286 B2
(45) Date of Patent: *Jan. 25, 2022

(54) RECHARGEABLE BATTERY HAVING A WALL ELEMENT AND WALL ELEMENT THEREFOR

(71) Applicant: Clarios Germany GmbH & Co., KGAA, Hannover (DE)

(72) Inventors: Dirk Bremer, Neustadt (DE); Peter Streuer, Hannover (DE)

(73) Assignee: Clarios Germany GmbH & Co. KG, Hannover (DE)

( * ) Notice: Subject to any disclaimer, the term of this patent is extended or adjusted under 35 U.S.C. 154(b) by 155 days.

This patent is subject to a terminal disclaimer.

(21) Appl. No.: 16/363,792

(22) Filed: Mar. 25, 2019

(65) Prior Publication Data

US 2019/0221784 A1 Jul. 18, 2019

Related U.S. Application Data

(62) Division of application No. 13/849,595, filed as application No. PCT/EP2011/005162 on Oct. 14, 2011, now Pat. No. 10,290,836.

(30) Foreign Application Priority Data

Oct. 15, 2010 (DE) ...................... 10 2010 048 428.8
Mar. 9, 2011 (DE) ...................... 20 2011 003 713.4

(51) Int. Cl.
*H01M 50/10* (2021.01)
*H01M 10/42* (2006.01)
*H01M 50/70* (2021.01)

(52) U.S. Cl.
CPC ....... *H01M 50/10* (2021.01); *H01M 10/4214* (2013.01); *H01M 50/70* (2021.01)

(58) Field of Classification Search
CPC .... H01M 10/4214; H01M 2/02; H01M 2/024; H01M 2/38; H01M 50/10; H01M 50/70; Y02E 60/10
See application file for complete search history.

(56) References Cited

U.S. PATENT DOCUMENTS 529,199 A 11/1894 Schoop et al.
916,320 A 3/1909 Joel
(Continued)

FOREIGN PATENT DOCUMENTS

CN 101308922 A 11/2008
CN 101379634 A 3/2009
(Continued)

OTHER PUBLICATIONS

International Preliminary Report on Patentability dated Apr. 25, 2013, for Appln. No. PCT/EP2011/005162 filed Oct. 14, 2011.
(Continued)

*Primary Examiner* — Matthew T Martin
(74) *Attorney, Agent, or Firm* — Boardman & Clark LLP

(57) ABSTRACT

The invention relates to a rechargeable battery comprising a battery housing which has a cell cavity, or several cell cavities separated by dividing walls. One or more of the cell cavities have at least one respective positive and negative electrode, separated from each other by at least one separator, and a liquid electrolyte. One or more of the cell cavities have a respective wall element, which partitions the respective cell cavity into at least two volume chambers which communicate with one another. At least in the lower regions of the volume chambers, a communicating connection between the volume chambers for the liquid electrolytes is provided and in the upper region of the volume chambers, a pressure compensation connection between the volume chambers for assuring equal air pressure in the volume chambers communicating chambers is provided. Also dis- (Continued)

Figure 1:
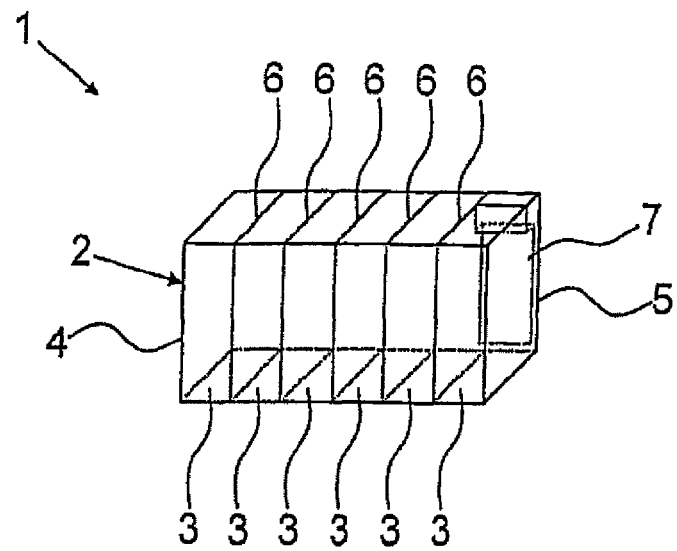

closed is a wall element for such a rechargeable battery, and a battery housing.

13 Claims, 17 Drawing Sheets

(56) References Cited

U.S. PATENT DOCUMENTS

| | | | |
|---|---|---|---|
| 2,584,117 | A | 2/1952 | Elrod et al. |
| 4,283,467 | A | 8/1981 | Guetlich et al. |
| 4,308,322 | A | 12/1981 | Hammar |
| 4,619,875 | A | 10/1986 | Stahura et al. |
| 4,945,011 | A | 7/1990 | Tanaka |
| 4,963,444 | A | 10/1990 | Delaney |
| 5,032,476 | A | 7/1991 | Kirby |
| 5,096,787 | A | 3/1992 | Delaney |
| 5,879,831 | A | 3/1999 | Ovshinsky et al. |
| 6,475,665 | B1 | 11/2002 | Okamoto et al. |
| 6,821,669 | B2 | 11/2004 | Tschirch |
| 10,290,836 | B2 | 5/2019 | Bremer et al. |
| 2002/0028373 | A1 | 3/2002 | Tschirch et al. |
| 2002/0034679 | A1 | 3/2002 | Iarochenko et al. |
| 2007/0009790 | A1 | 1/2007 | Vutetakis et al. |
| 2011/0314663 | A1 | 12/2011 | Bauer |
| 2012/0214032 | A1 | 8/2012 | Franklin et al. |
| 2013/0202949 | A1 | 8/2013 | Bremer et al. |
| 2013/0288090 | A1 | 10/2013 | Lee et al. |
| 2016/0294020 | A1 | 10/2016 | Schwab et al. |

FOREIGN PATENT DOCUMENTS

| | | |
|---|---|---|
| CN | 102640326 A | 8/2012 |
| CN | 103299450 A | 9/2013 |
| DE | 9115597 U1 | 5/1993 |
| DE | 102006021576 B3 | 9/2007 |
| DE | 102006021585 B3 | 9/2007 |
| WO | WO 89/12325 A1 | 12/1989 |
| WO | WO 89/12326 A1 | 12/1989 |
| WO | WO 2008019676 A2 | 2/2008 |
| WO | WO 2009077022 A1 | 6/2009 |
| WO | WO 2012048885 A1 | 4/2012 |

OTHER PUBLICATIONS

International Search Report and Written Opinion of the International Searching Authority for PCT/EP2011/005162 filed Oct. 14, 2011.

International Search Report and Written Opinion of the International Searching Authority dated Apr. 26, 2011, for PCT/US2010/047869 filed Sep. 3, 2010.

International Preliminary Report on Patentability dated Mar. 6, 2012, for Appln. No. PCT/US2010/047869 filed Sep. 3, 2010.

International Search Report and Written Opinion of the International Searching Authority dated Feb. 5, 2015, for Appln. No. PCT/EP2014/073661 filed Nov. 4, 2014.

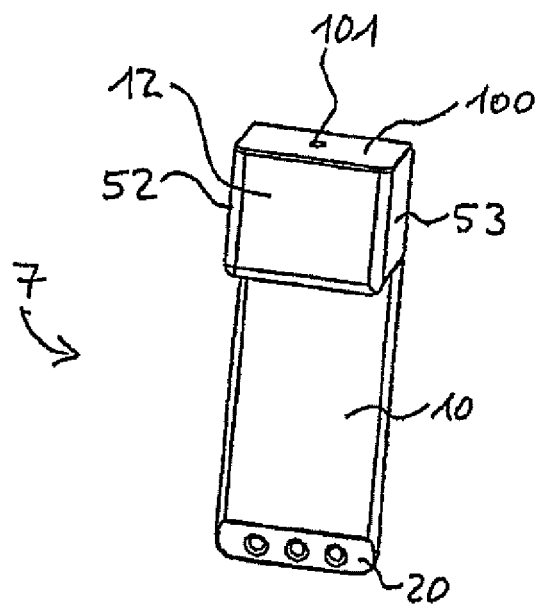
Fig. 10
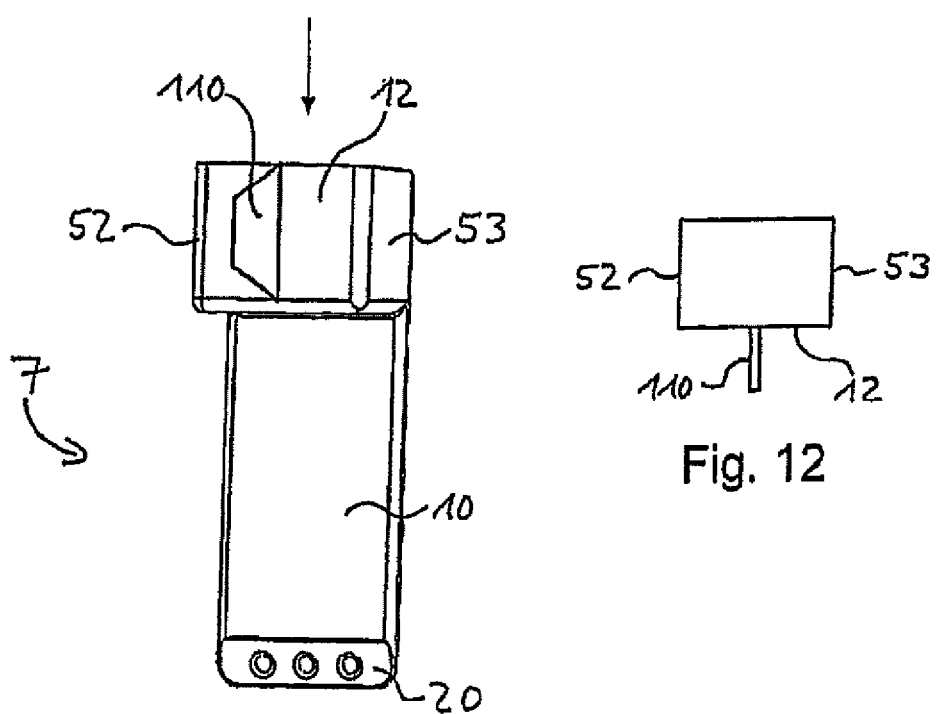
Fig. 12
Fig. 11

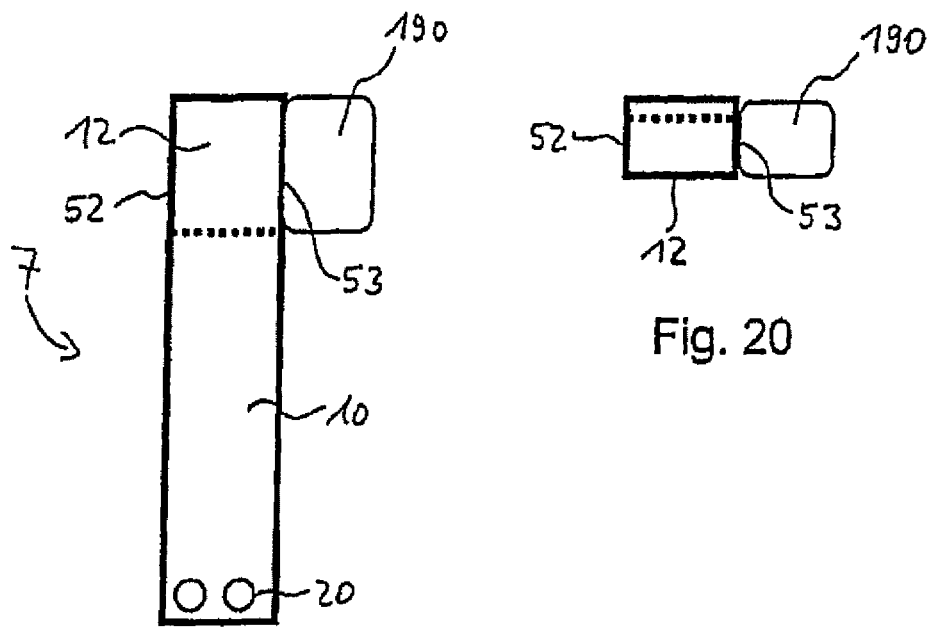
Fig. 20
Fig. 19
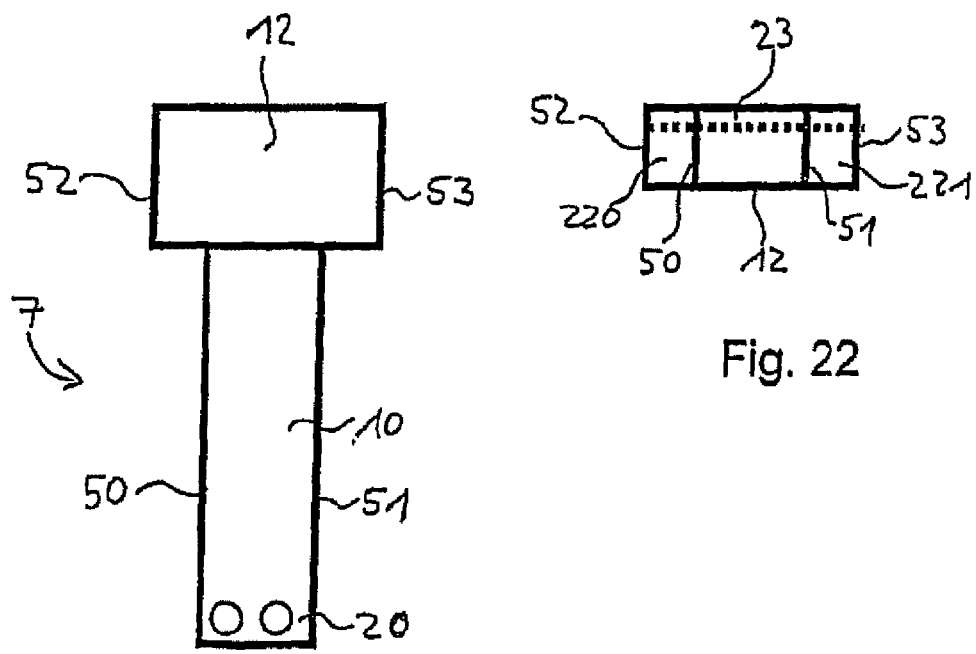
Fig. 22
Fig. 21

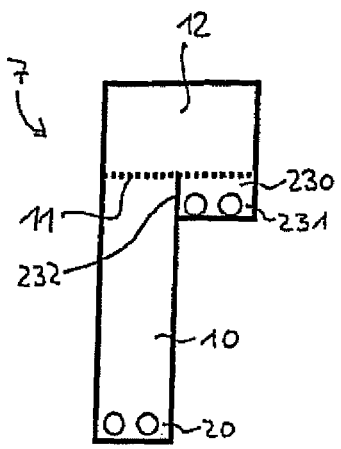
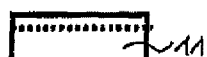
Fig. 23
Fig. 24
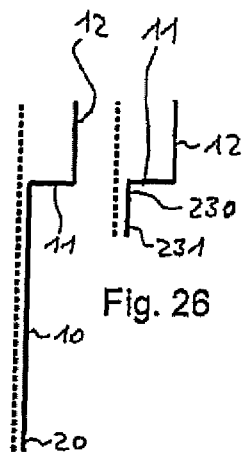
Fig. 25
Fig. 26
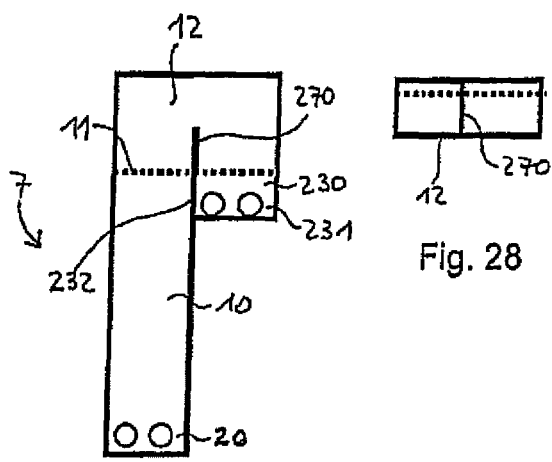
Fig. 27
Fig. 28
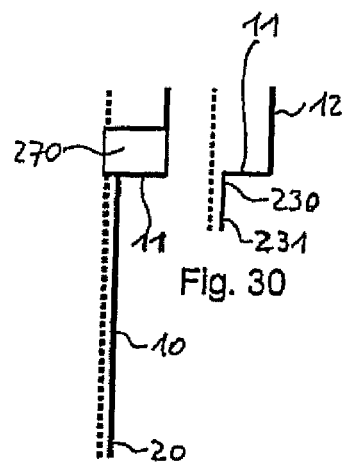
Fig. 29
Fig. 30

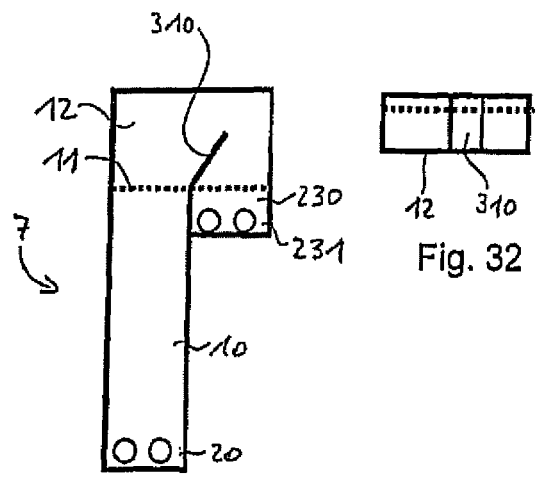
Fig. 31
Fig. 32
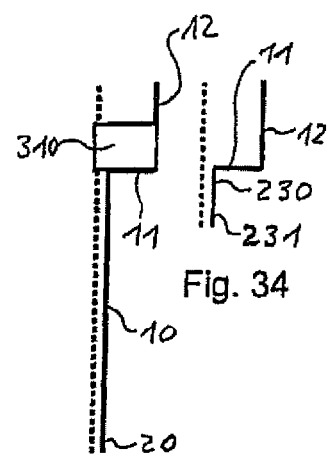
Fig. 34
Fig. 33
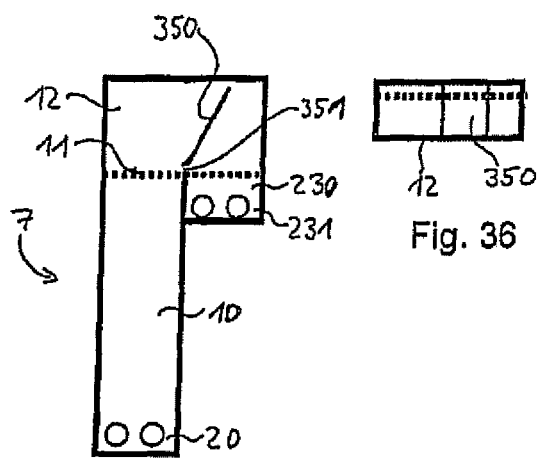
Fig. 35
Fig. 36
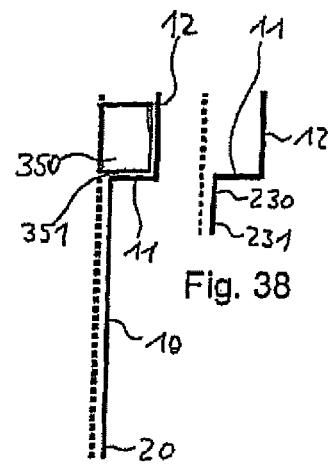
Fig. 38
Fig. 37

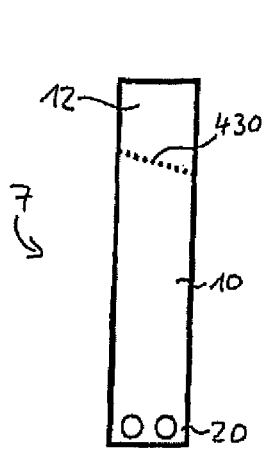 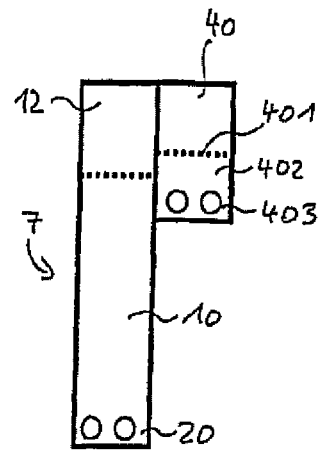 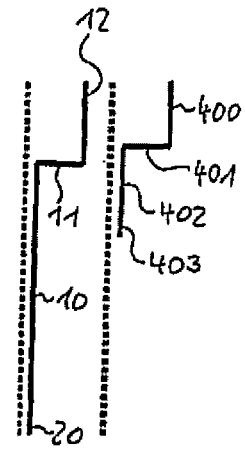
Fig. 43   Fig. 44   Fig. 45   Fig. 46
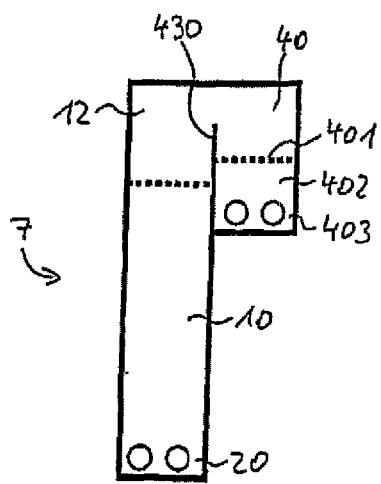 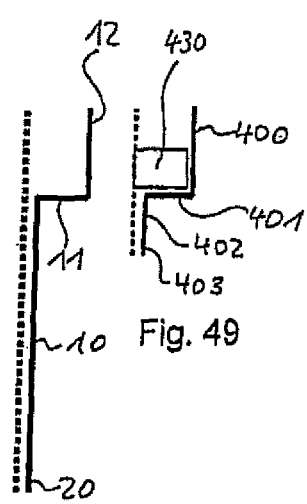
Fig. 47   Fig. 48

RECHARGEABLE BATTERY HAVING A WALL ELEMENT AND WALL ELEMENT THEREFOR

CROSS-REFERENCE TO RELATED APPLICATIONS

This application is a divisional of U.S. Non-Provisional patent application Ser. No. 13/879,595 filed Apr. 15, 2013, entitled "Rechargeable Battery Having a Wall Element and Wall Element Therefor," now U.S. Pat. No. 10,290,836 issued on May 14, 2019, which is a national stage entry of International Application No. PCT/EP11/05162 filed Oct. 14, 2011, entitled "Mixing Elements," which claims foreign priority to German Application No. DE 102010048428.8 filed Oct. 15, 2010, entitled "Mixing Elements," and German Application No, DE 20211003713.4 filed Mar. 9, 2011, entitled "Mixing Elements," the entire contents of each of which are incorporated herein by reference in their entirety.

The invention relates to a rechargeable battery having a wall element according to the features of the preamble of claim 1. The invention also relates to a wall element for such a rechargeable battery according to claim 2, and to a battery housing therefor according to claim 3.

Generic rechargeable batteries are known for example from DE 10 2007 061 662 A1, U.S. Pat. Nos. 4,963,444 A or 5,096,787 A.

The wall element is used to mix the electrolytes such that an acid coating is eliminated or at least considerably reduced.

One object of the present invention is to specify a rechargeable battery, with which the function of the wall element is optimized yet further compared to the known solutions. A further object of the invention is to specify for this purpose a suitable, improved wall element and a battery housing therefor.

This object is achieved by the invention specified in the claims. One or more of the features specified hereinafter or visible in the drawings are characterizing for this.

In so far as the terms "upper" and "lower" are used, these indications refer to the operating position of the rechargeable battery according to the specification, that is to say a substantially horizontal position, in which the rechargeable battery cover and filling openings thereof for the liquid electrolyte are arranged on top. In the case of a conventional movement stress according to the specification, a certain deviation from the horizontal position is permissible, for example as occurs during operation of a rechargeable battery in a motor vehicle. Operating positions deviating from those according to the specification are positions for example rotated through 90° or 180° compared to the horizontal position.

Figure 2:
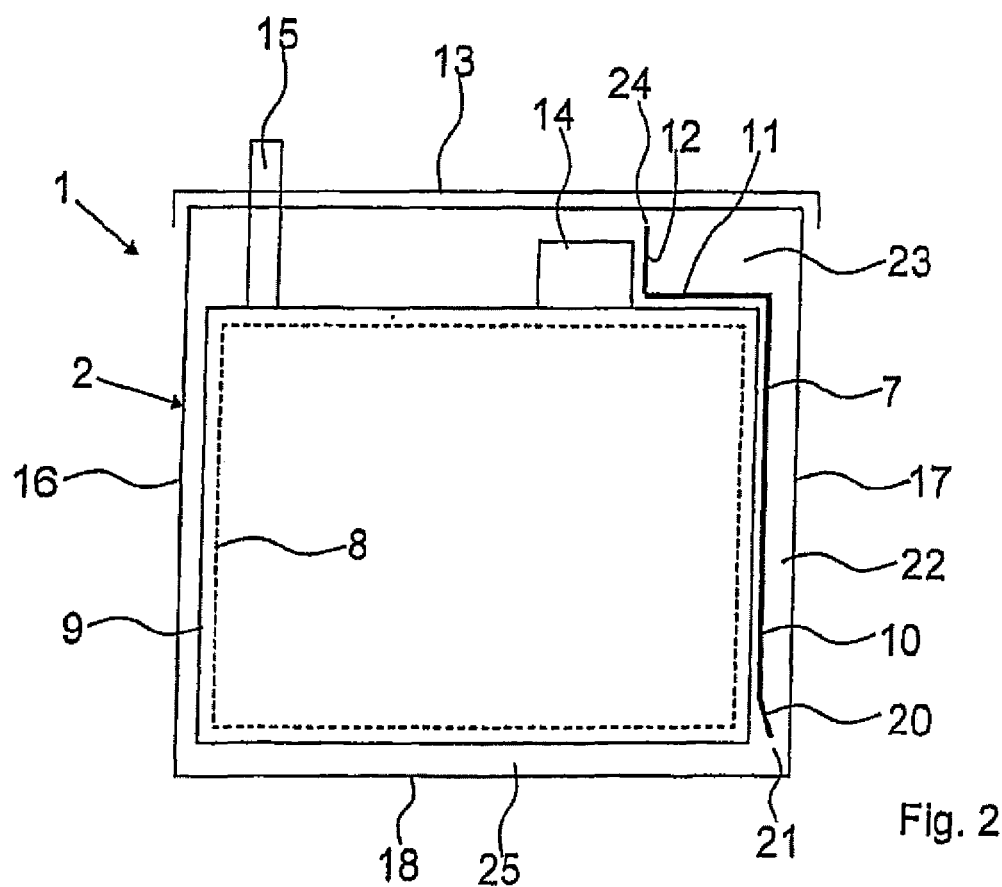
Figure 3:
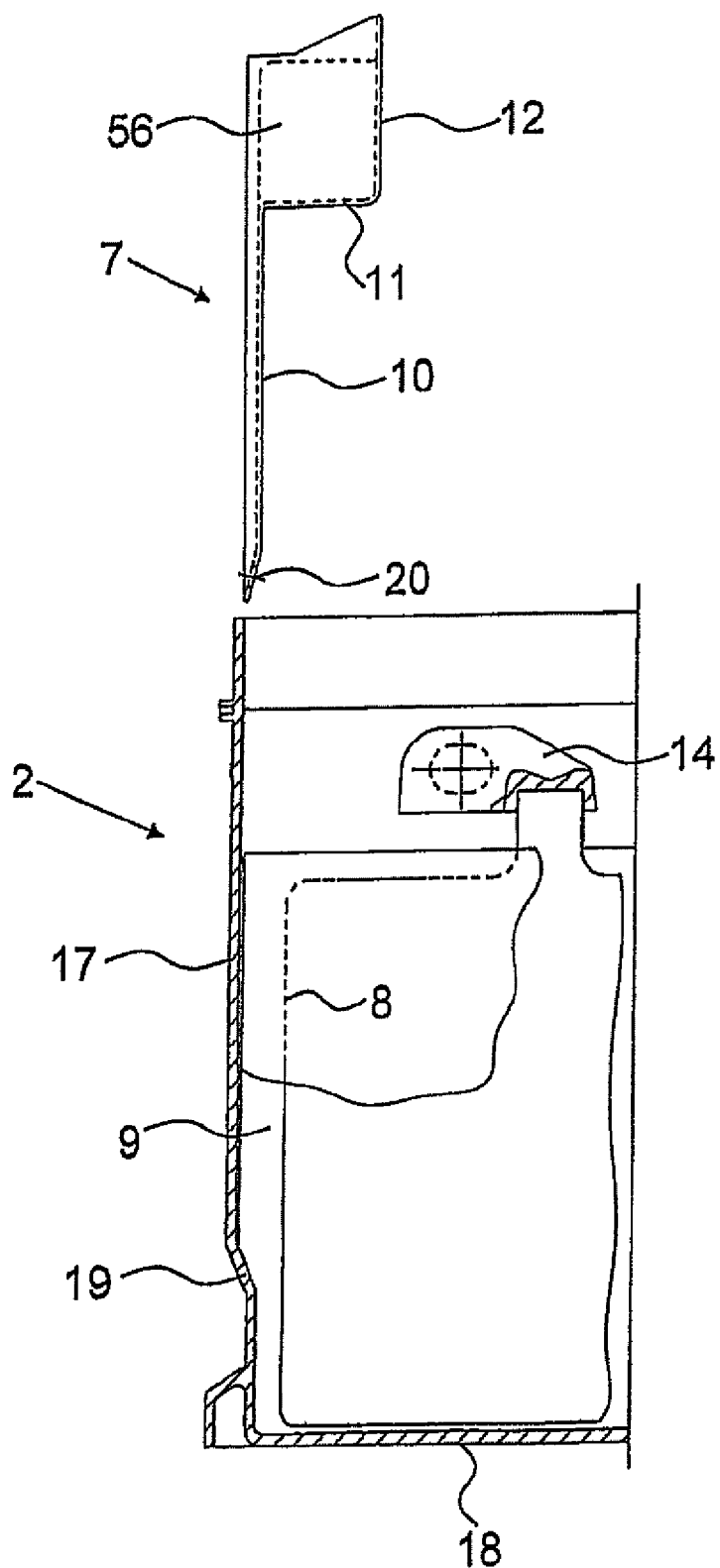
Figure 4:
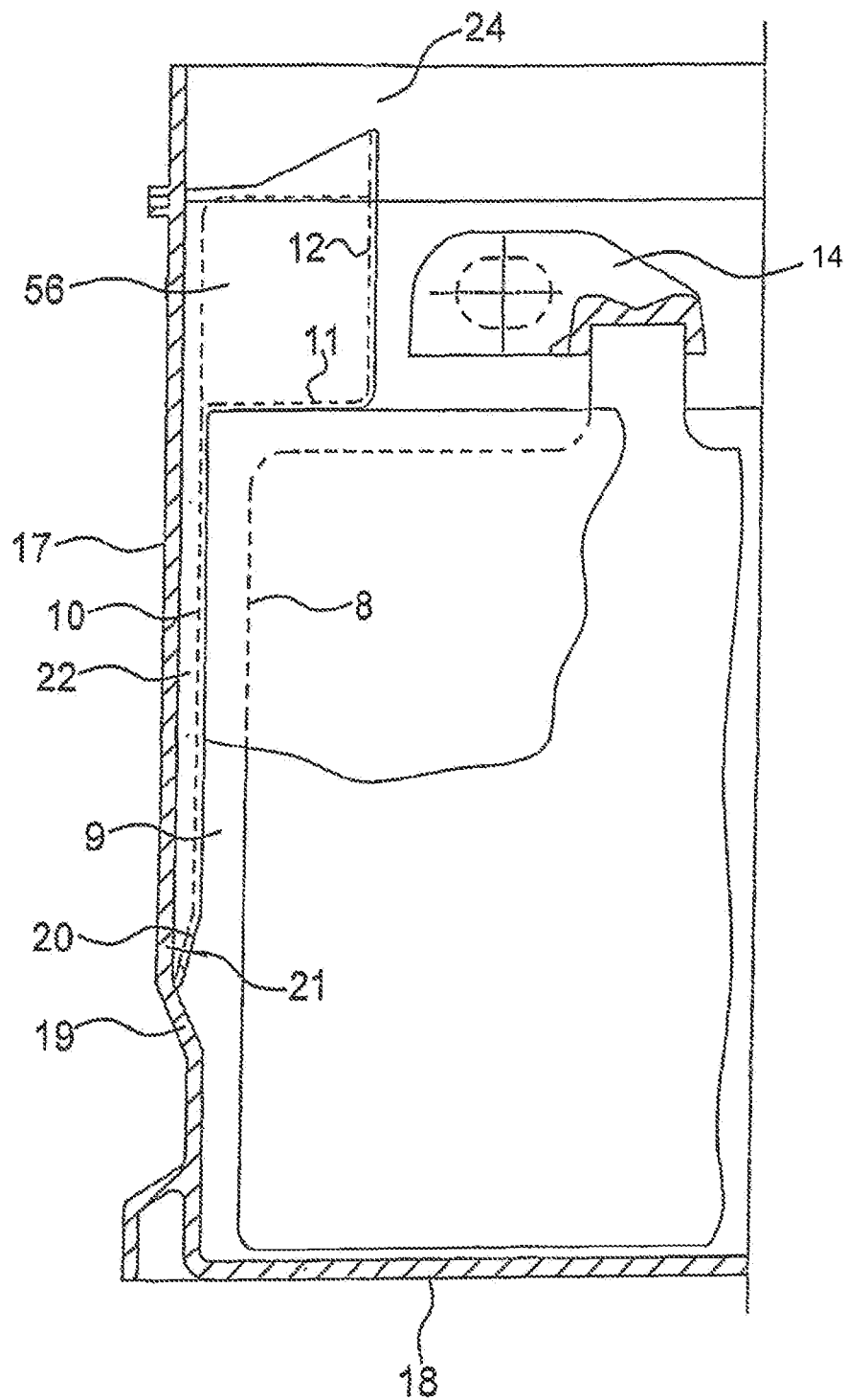
Figure 5:
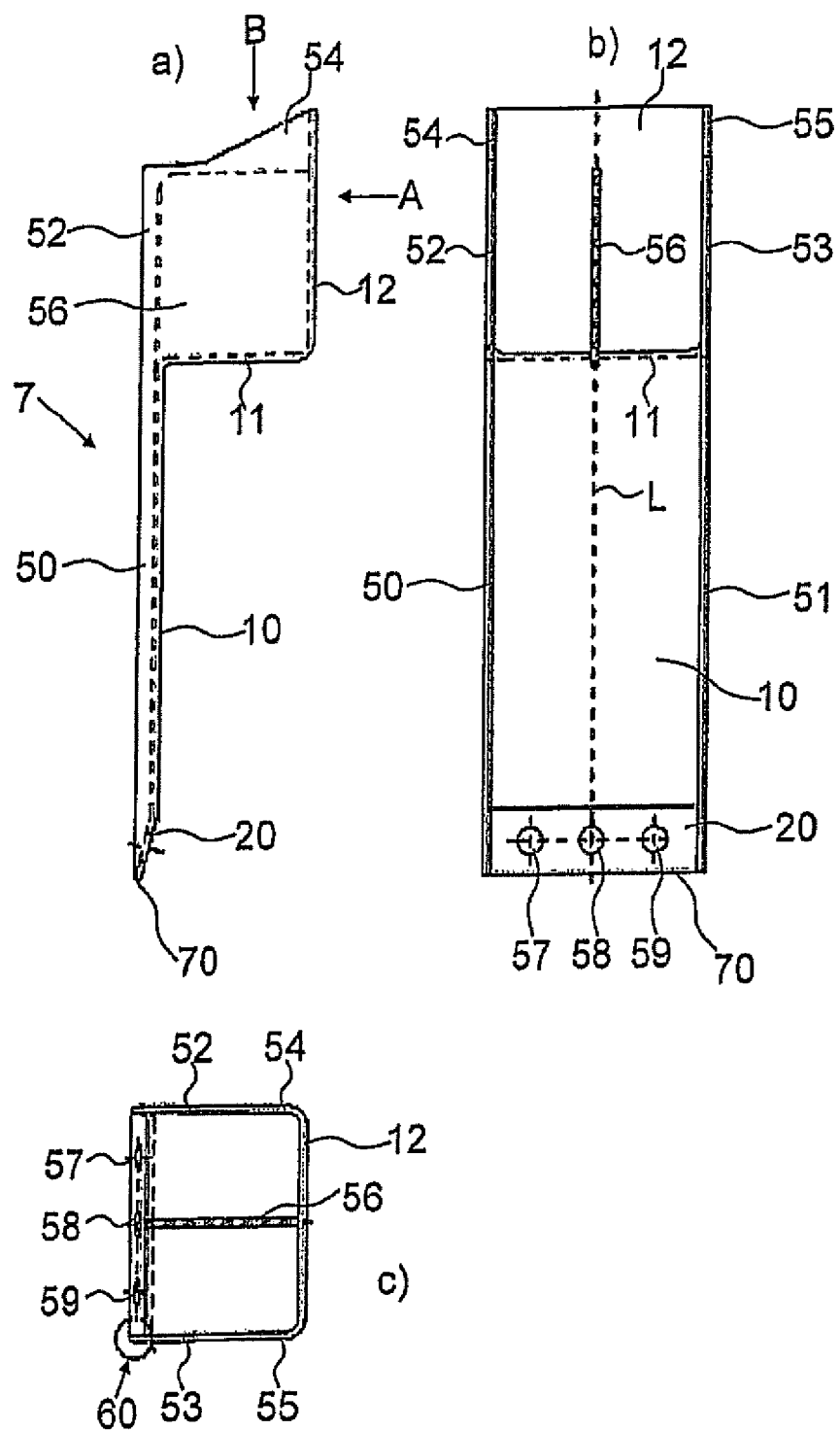
Figure 6:
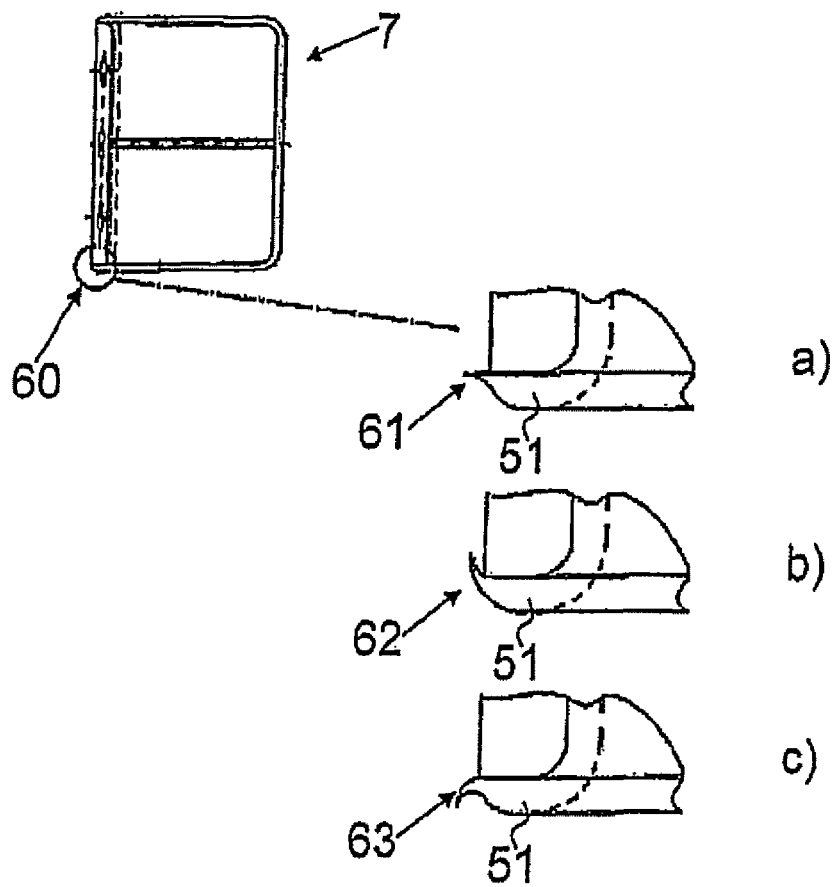
Figure 7:
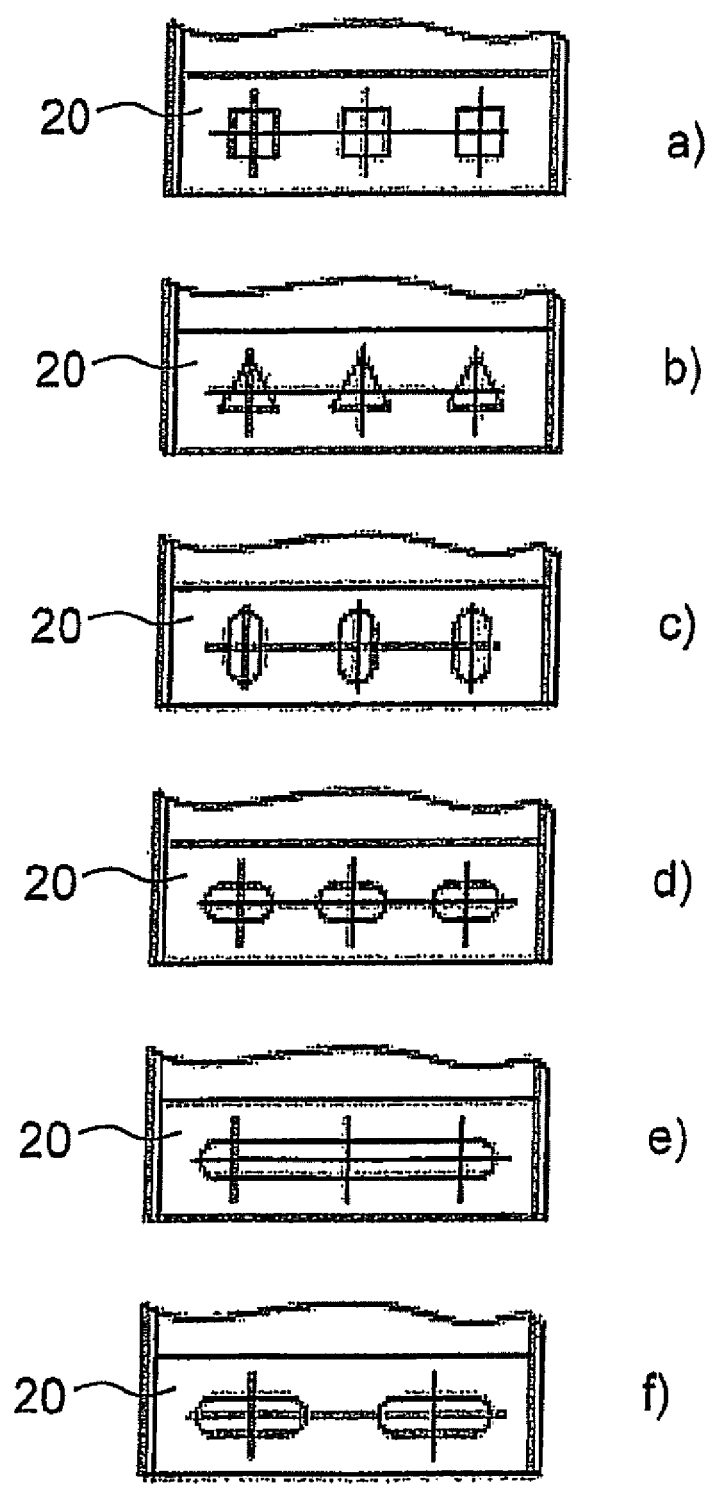
Figure 14:
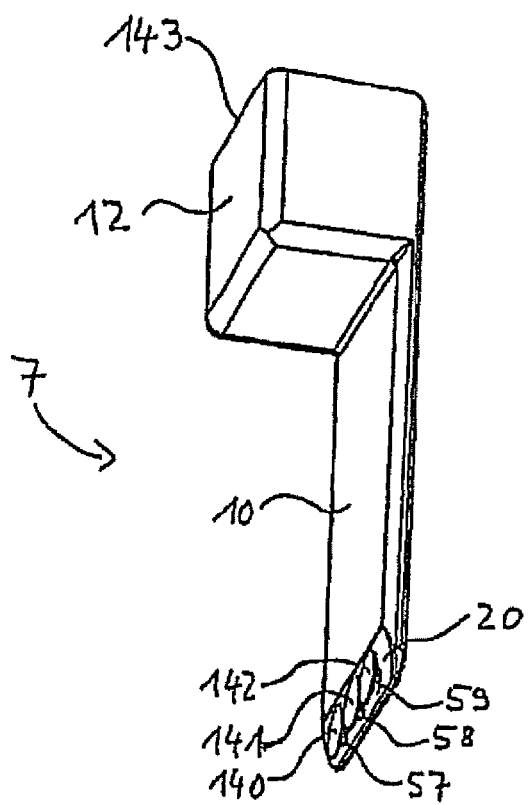
Figure 15:
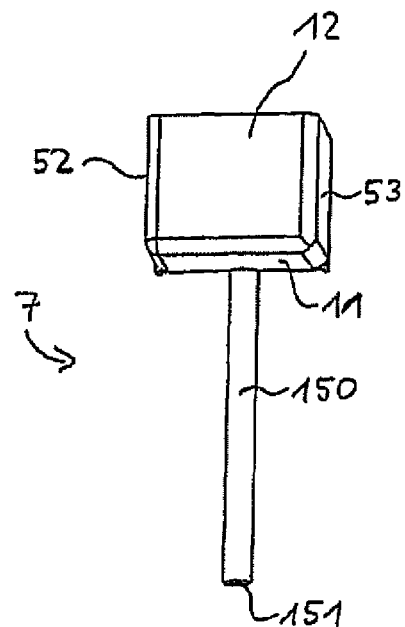
Figure 16:
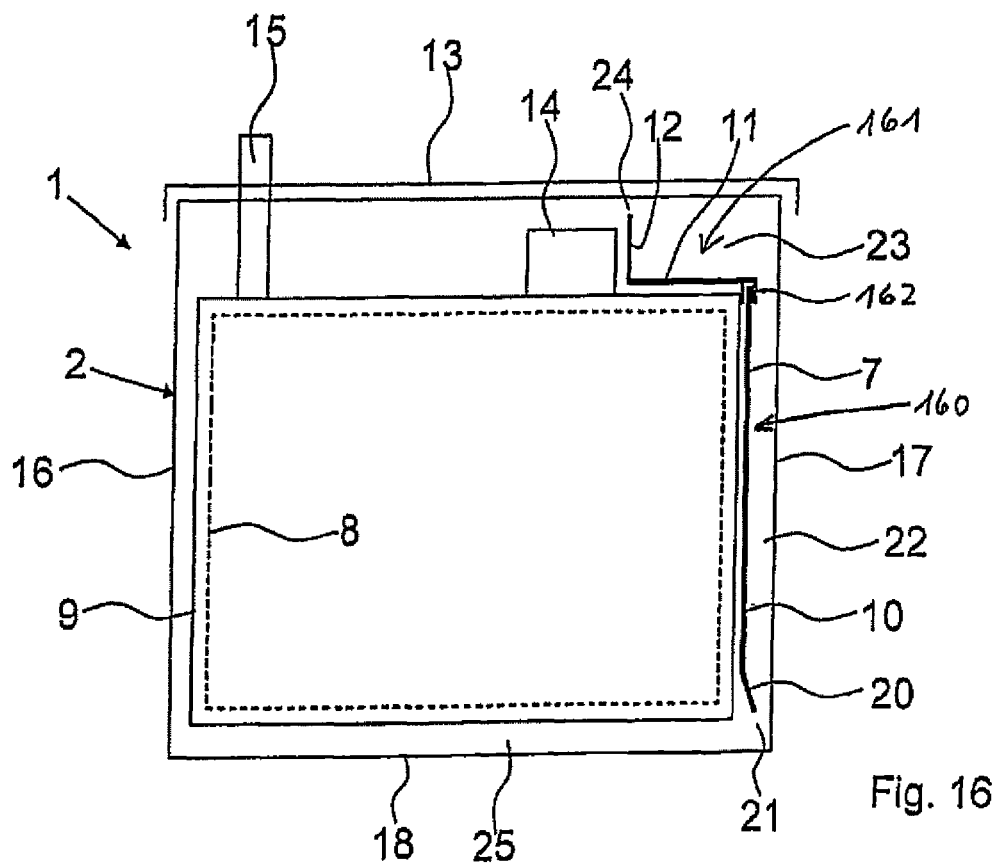
Figure 17:
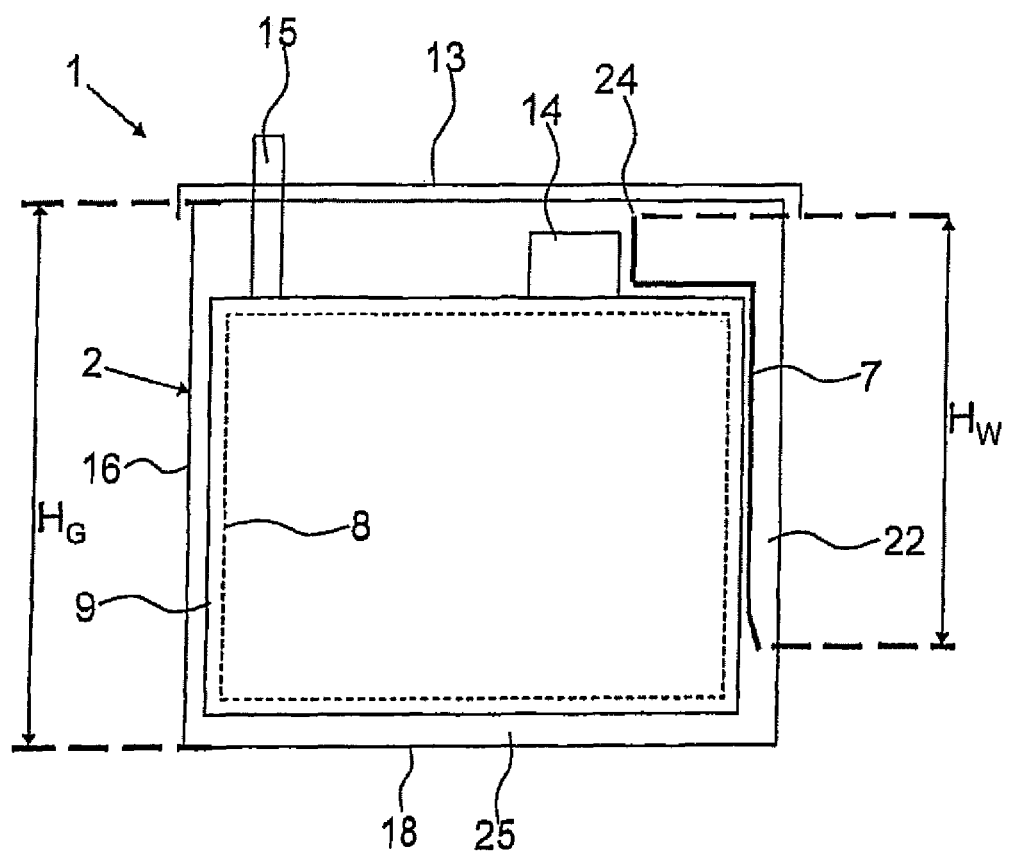
Figure 18:
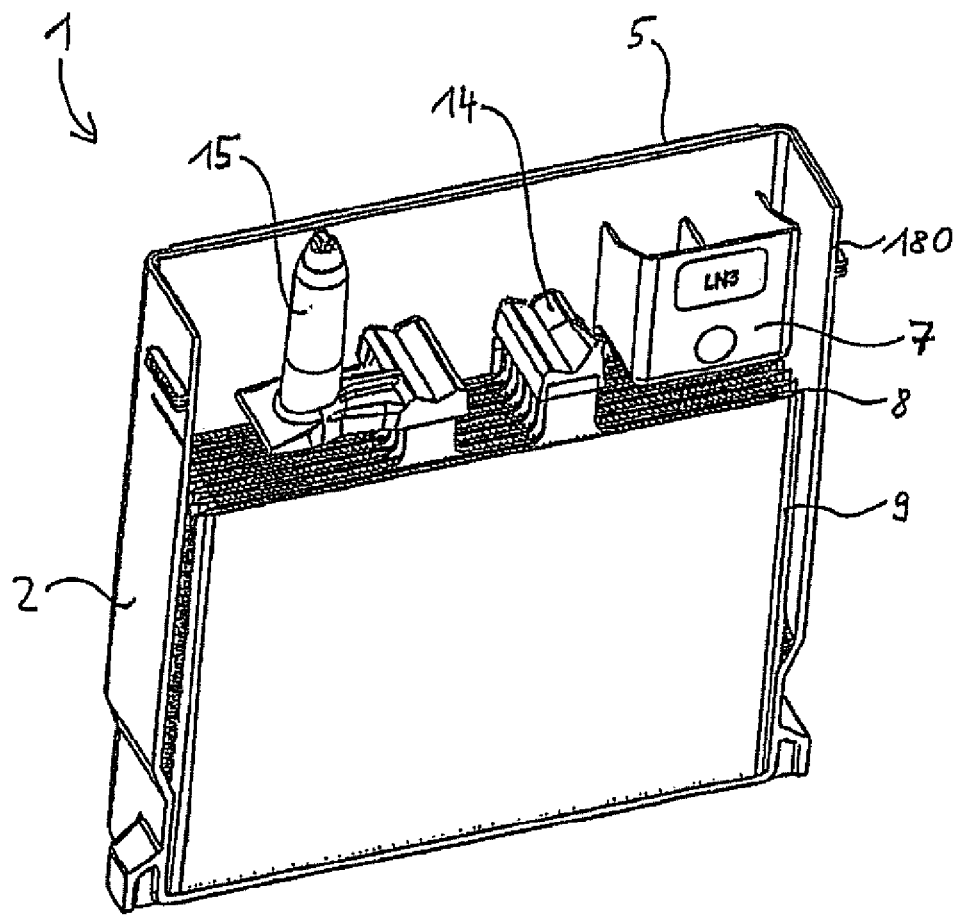

In the drawings:

FIG. 1 shows a perspective illustration of a battery housing of a six-cell rechargeable battery, and FIG. 2 shows a sectional illustration of the battery housing according to FIG. 1 in a side view, and FIGS. 3 and 4 show a partial view from the side of the battery housing in section, FIG. 5 shows views from three sides of a wall element, and FIG. 6 shows details of the wall element, and FIG. 7 shows further details of a wall element, and FIGS. 8 to 15 show further embodiments of a wall element, and FIGS. 16 to 18 show a sectional illustration of further embodiment of a battery housing, and FIGS. 19 to 49 show further embodiments of a wall element.

In the figures, like reference signs are used for corresponding elements. Edges that are not visible in the figures are represented by dashed or dotted lines.

The basic structure of a six-cell rechargeable battery will be explained first, with reference to FIGS. 1 and 2 simultaneously.

A rechargeable battery 1 comprises a battery housing 2, which has 6 cell cavities 3 in the illustrated example. The cell cavities 3 are sealed with respect to one another by intermediate walls 6 of the battery housing 2. The battery housing 2 comprises a left-hand and a right-hand side wall 4, 5, a front wall 16 and a rear wall 17 as outer walls. On the underside, the battery housing 2 comprises a lower wall 18 in the form of a base. The base 18 can be reinforced. The base 18 is used as a support face of the rechargeable battery when said battery is assembled, for example in a vehicle. The battery housing 2 is closed by a cover part 13, which is only indicated schematically in FIG. 2. The cover part 13 is formed in practice for example as a double cover with a labyrinth arranged therein. FIG. 1 shows the battery housing without the cover part 13 so that a wall element 7 illustrated in the interior of the right-hand cell cavity 3 is visible.

Electrode plates 8, which are each surrounded by a pocket-shaped separator 9 and are insulated with respect to one another, are arranged in a cell cavity 3. The separators 9 are therefore formed so as to be slightly overlapping with respect to the electrode plates 8. By way of example, an outer terminal 15 in the form of a battery pole of the rechargeable battery 1 and also an internal cell connector 14, which is used for the connection of different cell cavities between the electrodes, is also illustrated in FIG. 2.

As can also be seen, the wall element 7 is formed from an upper partition wall portion 12, which runs substantially vertically, a lower partition wall 10, which likewise runs substantially vertically, and a substantially horizontally running central partition wall portion 11 connecting the upper and the lower partition wall portion 10, 12. Due to its shaping, the wall element 7 can nestle effectively into a gap between the rear wall 17 and the separators 9 in the lower region and into the clearance between the rear wall 17 and the cell connector 14 and can effectively utilize the space available here.

Due to the wall element 7, a storage space 23 is formed in the upper region and a through-duct 22 is formed in the lower region, said through-duct having a smaller horizontal cross section than the storage space 23. Above the wall element 7, a pressure compensation connection 24 is provided, which is used for the exchange of air. A communicating connection 21, via which the volume formed by the storage space 23 and the through-duct 22 is connected to a further volume 25 provided on the other side of the through-opening 21, is provided beneath the wall element 7. The volume 23, 22 on the one hand and the volume 25 on the other hand are thus formed as volumes communicating with one another in the manner of communicating pipes.

The lower partition wall portion 10 ends with the insertion chamfer 20, which can be formed as a wall portion that is angled with respect to the lower partition wall portion 10 and that is angled away from the electrodes 8 and separators 9 of the cell cavity 3.

FIG. 3 shows a sectional illustration of a detail of the battery housing 2, wherein only the regions necessary for the explanation of the wall element 7 are illustrated. In this case, FIG. 3 shows the wall element 7 before insertion into the battery housing 2.

FIG. 4 shows the same detail as FIG. 3, but with the wall element 7 already inserted as far as its end position. As can be seen, the battery housing 2 on the rear wall 17 has a constriction 19, that is to say a chamfered part, beneath which the horizontal cross-sectional area of the battery housing 2 is reduced. The constriction 19 is also used as an end position for the wall portion located to the front during the insertion process, that is to say for the front side of the insertion chamfer 20.

An assembly aid element 56, which will be explained in greater detail with reference to FIG. 5, as will further features of the wall element 7, can also be seen in FIGS. 3 and 4.

In accordance with an advantageous method for insertion of the wall element 7, for assembly on the assembly aid element 56, the wall element 7 is grasped manually or by an assembly robot and is tilted slightly and is inserted parallel along the inner face of the rear wall 17 with the insertion chamfer 20 to the front. In this case, an acute angle is produced between the rear wall 17 and the wall element 7. As soon as the insertion chamfer 20 has been inserted into the space between the separators 9 and the rear wall 17, the wall element is oriented vertically and is inserted as far as its end position, that is to say until the insertion chamfer 20 reaches the constriction 19 of the battery housing 2.

FIG. 5 shows views from three sides of the wall element according to FIGS. 3 and 4. FIG. 5a shows a side view of the wall element, FIG. 5b shows a front view, that is to say in viewing direction A, and FIG. 5c shows a view from above, that is to say in viewing direction B.

As can be seen, the wall element 7 comprises the assembly aid element 56 in the form of a wall oriented approximately in the center along a longitudinal axis L of the wall element 7. The assembly aid element 56 thus forms a type of intermediate wall or rib.

It can also be seen that the wall element 7 in the lower end region of the lower partition wall portion 10 has an insertion chamfer 20, which tapers approximately linearly in a ramp-like manner toward the end of the wall element 7.

The wall element 7 has additional side walls 50, 51, 52, 53, 54, 55, which extend approximately parallel, based on the position after insertion of the wall element 7 into the battery housing 2, with respect to the intermediate walls 6 or the left-hand and right-hand side walls 4, 5 of the battery housing 2. In the upper region of the wall element 7, the side walls 52, 53 are formed with additional side wall portions 54, 55 running approximately linearly upwardly in the direction of the upper partition wall 12. The side walls 50, 51 in the lower partition wall portion 10 are also used as spacer elements, which ensure that a pressure exerted by the separators 9 onto the lower partition wall portion 10 does not lead to an undesired reduction of the cross-sectional area of passage of the through-duct 22.

As can also be seen, the wall element 7 in the region of the insertion chamfer 20 has openings 57, 58, 59, for example three openings as illustrated in FIG. 5b. The openings 57, 58, 59 form the through-duct 21.

As is also indicated in FIG. 5c by the encircled region 60, the side walls 50, 51, 52, 53 may have a specific shaping in order to seal between the communicating volumes.

Advantageous embodiments for this seal are illustrated in FIG. 6 on the basis of enlarged details of the encircled region 60. The seal can be formed in the manner of a sealing lip formed integrally on the side walls, as is presented by way of example in FIGS. 6a, b and c with reference to the side wall 51. FIG. 6a shows a sealing lip 61, which protrudes in a straight line and, in the installed state of the wall element, is directed toward the rear wall 17. FIG. 6b shows a sealing lip 62 that is directed inwardly toward the through-duct 22, and FIG. 6c shows a sealing lip 63 directed outwardly away from the through-duct 22.

FIG. 7, on the basis of a detail of the wall element 7, which shows substantially only the region of the insertion chamfer 20, shows different embodiments of the openings 57, 58, 59, which act as a through-opening 21. In addition to the circular shape already illustrated on the basis of FIG. 5b, the openings may also be square or rectangular (FIG. 7a), triangular (FIG. 7b), oval in different orientations (FIGS. 7c and d), formed in the manner of one or more elongate slots (FIG. 7e), or formed in the manner of two or more elongate or oval slots (FIG. 7f). Any combination of such embodiments can also be provided advantageously. The use of three openings has proven to be favorable, although more or fewer openings can also be provided depending on the embodiment. The described embodiments of the openings can also be rotated or inclined by a specific angle, for example by 45° or 180°, by contrast to the position specifically illustrated in FIG. 7.

In accordance with an advantageous embodiment, the rechargeable battery comprises a wall element 7, which is formed as a separate component that can be inserted into a cell cavity 3. This has the advantage that the wall element can be produced separately and can be inserted into the cell cavity of a rechargeable battery as required. Rechargeable batteries comprising the wall element and also without the wall element can thus be produced cost-effectively, without the need for different injection molding molds for the production of the two variants of the housing parts, as would be necessary with a rigidly integrally formed wall element. In addition, rechargeable batteries from prior series manufacture can also be changed in a simple manner, that is to say without great outlay in terms of the production devices, to rechargeable batteries with an integrated mixing device in the form of the wall element.

In accordance with an advantageous embodiment, the wall element, in the wall portion located to the front during insertion of the wall element 7, has a region formed as an insertion chamfer 20, in which a wall portion of the wall element 7 arranged on the end 70 located to the front during insertion runs at an incline with respect to the electrodes 8 and separators 9 of the cell cavity 3. The wall portion running at an incline may run for example at an angle in the range from 5 to 60 degrees with respect to the edge of the electrodes and separators of the cell cavity. In this region, the wall element tapers toward its end located to the front during insertion, more specifically away from the electrodes and separators of the cell cavity. Undesired damage of the separators and electrodes can be avoided as a result of such an insertion chamfer. It has been found that, with modern rechargeable batteries, the separators (also referred to as partitioners) intended to separate the positive and negative electrodes may in many cases protrude laterally beyond the actual electrodes, for example for reasons due to the manufacturing process. The elements arranged in the way so to speak in the insertion region are pressed gently to the side by the insertion chamfer and remain undamaged. The insertion chamfer may run in a straight line, in a curved manner or in an angled manner in the direction of insertion. In the case of a straight progression, a ramp-like tapering of the region formed as an insertion chamfer is produced.

The described wall element can be formed in terms of its height, that is to say its longitudinal extension, such that a cyclic circulation of the electrolyte in the event of movement stress of the rechargeable battery is produced in such a way that electrolyte sloshes over the upper edge of the wall element and continues to flow away via the lower, communicating connection, as described for example in U.S. Pat. No. 5,096,787. In this case, the wall element has the function of a hydrostatic pump.

In accordance with an advantageous embodiment, the wall element 7 extends at least so far upwardly that, in the event of the movement stress of the rechargeable battery 1 according to the specification, for example as occurs with a moving vehicle, an overflow of liquid electrolyte between the two volumes 22, 23, 25 communicating with one another over the upper edge of the wall element 7 is prevented. The principle of communicating pipes can thus be implemented as a result. A movement of the electrolyte back and forth via the communicating connection in the lower region of the volumes is enforced rather than a circulation of the electrolyte, as is the case with the principle of the hydrostatic pump. This has the advantage that sludge collected at the base of the rechargeable battery remains there, since there is no circulation of the electrolyte. The electrolyte movement enforced hereby is sufficient to mix the electrolyte such that an acid coating is eliminated or is at least considerably reduced.

The communicating connection in the lower region of the volumes, through which the liquid electrolyte can flow, can be formed in different ways, for example by a gap between the end of the wall element and the adjacent wall of the cell cavity or the base of the rechargeable battery housing. In accordance with an advantageous embodiment, one or more openings 57, 58, 59 are provided in the lower region of the wall element 7, it being possible for electrolyte to flow back and forth through said openings between the two volumes 22, 23, 25 communicating with one another.

The aforementioned openings can be arranged at different points of the wall element, preferably in the lower region of course. In accordance with an advantageous embodiment, the wall portion comprising the insertion chamfer 20 has one or more openings 57, 58, 59, through which electrolyte can flow back and forth between the two volumes 22, 23, 25 communicating with one another. The openings in the insertion chamfer may be provided in the lower region of the wall element, either additionally or alternatively to the previously mentioned openings.

The openings may be open on one side in principle, that is to say not completely surrounded by the material of the wall element. In accordance with an advantageous embodiment, one, more or all openings 57, 58, 59 are formed as apertures in the wall element 7, which are surrounded by the material of the wall element 7. This has the advantage that the effect of the insertion chamfer is not negatively influenced by the openings, in particular the function of gently pressing to the side by means of the insertion chamfer the parts arranged in the way, without damaging the separators.

In accordance with an advantageous embodiment, the wall portion located to the front during insertion of the wall element 7 has a straight or convex contour 70. This is likewise advantageous for gentle insertion of the wall element and for the avoidance of damage to the separators.

In accordance with an advantageous embodiment, the wall element 7 comprises a lower partition wall portion 10 and an upper partition wall portion 12 and also a substantially horizontally running central partition wall portion 11, which tightly connects the lower partition wall portion 10 to the upper partition wall portion 12, wherein, when the wall element 7 is inserted into a cell cavity 3, the upper, the central and the lower partition wall portion 10, 11, 12 form a partition wall between the two volumes 22, 23, 25 communicating with one another. The partition wall portions form a partition wall between the two volumes communicating with one another, that is to say they divide the cell cavity into the at least two volumes. Here, the upper partition wall portion may be arranged directly adjacent to the lower partition wall portion and therefore connected tightly thereto. In accordance with an advantageous embodiment, the partition wall portion are arranged in such a way that the wall element, when inserted into the cell cavity, forms a through-duct for the electrolyte by means of the lower partition wall portion and forms a storage space for the electrolyte by means of the upper partition wall portion. The storage space has a larger horizontal cross-sectional area in the center than the through-duct. For example, the upper partition wall portion may thus be angled with respect to the lower partition wall portion and may be oriented more heavily in the direction of the electrodes than the lower partition wall portion. A larger quantity of electrolyte can thus collect in the storage space, whereas the narrow through-duct ensures an increased flow rate of the electrolyte flowing through.

In accordance with an advantageous embodiment, the wall element has a lower partition wall portion and an upper partition wall portion and also a central partition wall portion running substantially horizontally based on the installed position in the rechargeable battery. The central partition wall portion tightly connects the lower partition wall portion to the upper partition wall portion. When the wall element is inserted into a cell cavity, the upper, the central and the lower partition wall portion form a partition wall between the two volumes communicating with one another. Due to the arrangement of a substantially horizontally running central partition wall portion, the available volume of the storage space can be maximized. Substantially the entire space available above the electrodes as far as the cover of the rechargeable battery can be utilized for the storage space. In accordance with an advantageous embodiment, the lower partition wall portion and the upper partition wall portion run substantially vertically, based on the installed position in the rechargeable battery.

The wall element can be fastened inseparably in the rechargeable battery, for example by adhesive bonding or welding to walls of the battery housing. In accordance with an advantageous embodiment, the wall element 7 can be fastened releasably in a cell cavity 3 by means of a plug-in fastening. This has the advantage that the wall element can be assembled in the rechargeable battery very quickly and with few process steps. In particular, there is no need for a waiting period, which would be necessary for the drying of an adhesive. A separate process step for welding or another means of connection can also be saved. The plug-in fastening can be formed for example as a clamp fastening in such a way that the wall element is held in the cell cavity by frictional forces. The plug-in fastening may also comprise a latching or locking action, wherein the latching or locking elements conventional in the field of plastics engineering can be used advantageously.

In accordance with an advantageous embodiment, at least one wall region 50, 51, 52, 53 of the wall element 7, which is intended to bear against a delimitating wall 17 of the cell cavity 3, comprises an integrally formed sealing lip 61, 62, 63 for sealing between the two volumes 22, 23, 25 communicating with one another. This has the advantage that a sealed separation between the volumes communicating with one another can be implemented by simple and cost-effective means. In particular, no separate seal elements are to be provided, which simplifies the production and assembly of the wall element.

In accordance with an advantageous embodiment, the wall element 7 comprises an integrally formed assembly aid element 56 in the upper region, said assembly aid element being designed for grasping of the wall element 7 by an automatic manufacturing device. The assembly aid element, for example in the form of a shank or as an intermediate wall, for example in the manner of a rib, can be formed integrally on an upper partition wall portion of the wall element. The assembly aid element has the advantage that rechargeable batteries can thus be fitted automatically with wall elements of this type in a simple and quick manner. Manual fitting is also simplified by the assembly aid element. The wall element can be used in a reliably guided and accurately placed manner as a result of the assembly aid element.

In accordance with an advantageous embodiment, all edges of the wall element 7 sliding along the separators 9 during insertion of the wall element 7 are rounded. Provided the rechargeable battery comprises separators, which protrude with respect to the electrodes, more specifically as far as the insertion region of the wall element, the rounded edges advantageously assist the insertion of the wall element and avoid damage of the separators.

In accordance with an advantageous embodiment, the width of the wall element corresponds to the inner width of a cell cavity.

In accordance with an advantageous embodiment, the wall element 7 comprises at least one partition wall portion 10, 11, 12, which extends from a delimiting wall 4, 5, 6 of the cell cavity 3 to an opposed delimiting wall 4, 5, 6 of the cell cavity 3 and forms a partition wall between the two volumes 22, 23, 25 communicating with one another, and the wall element 7 comprises side walls 50, 51, 52, 53, 54, 55, which, when the wall element 7 is inserted, bear in a planar manner against the delimiting walls 4, 5, 6 of the cell cavity 3. The side walls allow a reliable plug-in fastening of the wall element by means of friction with a simultaneous effective seal between the volumes communicating with one another.

In accordance with an advantageous embodiment, the longitudinal extension of the side walls 54, 55 in the longitudinal direction L of the wall element 7 reduces away from the partition wall portion 12. A prevention of the sloshing of the electrolyte over the upper edge of the wall element can thus be avoided in an efficient and cost-effective manner, and a pressure compensation connection can be formed at the same time between the volumes. In accordance with an advantageous embodiment, the partition wall portion extends at the upper side of the wall element as far as a cover part of the rechargeable battery. When the cover part is fitted, the partition wall portion thus contacts the cover part, which has the advantage that the wall element can be held in its position additionally by the cover part.

In accordance with an advantageous embodiment, the wall element comprises at least one partition wall portion 10, which forms a partition wall between the two volumes 22, 23, 25 communicating with one another, and the wall element 7 comprises, at least in the lower region, at least one integrally formed spacer element 50, 51, which, when the wall element 7 is inserted, is arranged between the partition wall portion 10 and a delimiting wall 17 of the cell cavity 3 opposite the partition wall portion 10, wherein, when the wall element 7 is inserted, the partition wall portion 10 is held by means of the spacer element 50, 51 at a distance from the opposed delimiting wall 17 of the cell cavity 3 against the force of separators 9 protruding beyond the electrodes 8, said force acting on the partition wall portion 10. This has the advantage that the communicating connection between the volumes can be held open by means of the spacer element and is not undesirably constricted or closed by pressing forces, which may be high, of the separators. A plurality of spacer elements may advantageously also be provided, for example in the form of spacer ribs, which are provided laterally on the wall element and which for example may be formed in the manner of side walls. A through-duct that is always of constant size is thus retained for the acid exchange.

In accordance with an advantageous embodiment, the wall element, and for example also the battery housing, is produced from polypropylene or another suitable material that is flexible and acid resistant.

Figure 8:
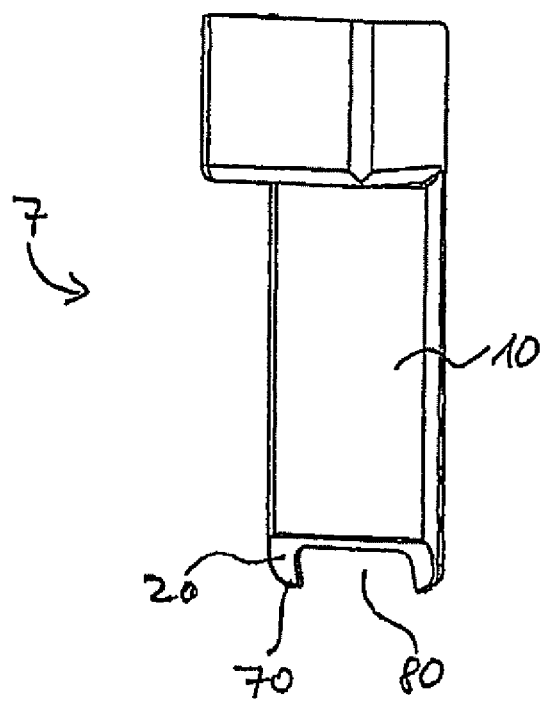

FIG. 8 shows an advantageous embodiment of a wall element 7, in which the lower region, in which the communicating connection 21 between the volumes 22, 25 is formed, has a cut-out opening 80. The opening 80 is not formed as an opening surrounded completely by the material of the wall element 7, as described with reference to FIG. 7 for example, but is open at least on one side. The cut-out opening 80 points downwardly, for example when the wall element 7 is inserted into the battery housing 2. The cut-out opening 80 can be arranged for example in the region formed as an insertion chamfer 20.

In the lower region of the side walls 50, 51, the wall element 7 may also comprise openings of the previously described type, for example openings in the manner of the openings 57, 58, 59 or in the manner of the cut-out opening 80.

Figure 9:
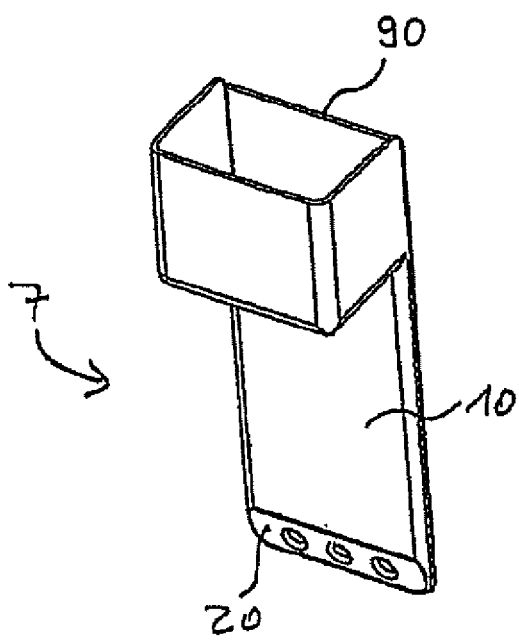

FIG. 9 shows an advantageous embodiment of a wall element 7, which additionally comprises a rear wall 90. For the rest, the illustrated wall element 7 corresponds to the embodiment according to FIG. 5. Due to the rear wall, volumes 22, 23 also closed on the rear side can be created, and therefore the wall element 7 does not necessarily have to be arranged bearing against an inner or outer wall 4, 5, 6, 16, 17 of the battery housing. A wall element according to FIG. 9 with the rear wall 90 can be produced for example as a blow molded part.

FIG. 10 shows an advantageous embodiment of a wall element 7, in which a cover 100 is arranged on the upper side of the volume 23 and closes the wall element 7 from above. The cover 100 comprises an opening 101 for the production of a pressure compensation connection. The wall element 7 according to FIG. 10 otherwise corresponds to the wall element according to FIG. 5.

FIG. 11 shows an advantageous embodiment of a wall element 7, in which a retaining element 110 is integrally formed on the outer side, that is to say on the side facing the volume 25, in which the electrodes 8 are located, and protrudes from the upper partition wall portion 12, for example approximately at a right angle or possibly also at another angle. FIG. 12 shows the wall element 7 according to FIG. 11 in a view from above, that is to say in the direction of the arrow illustrated in FIG. 11. Comparably to the assembly aid element 56, the retaining element 110 can be formed as an assembly aid during insertion of the wall element 7 into the battery housing 2.

Both an inwardly arranged assembly aid element 56 and an outwardly arranged retaining element 110 can be provided on the wall element 7.

Figure 13:
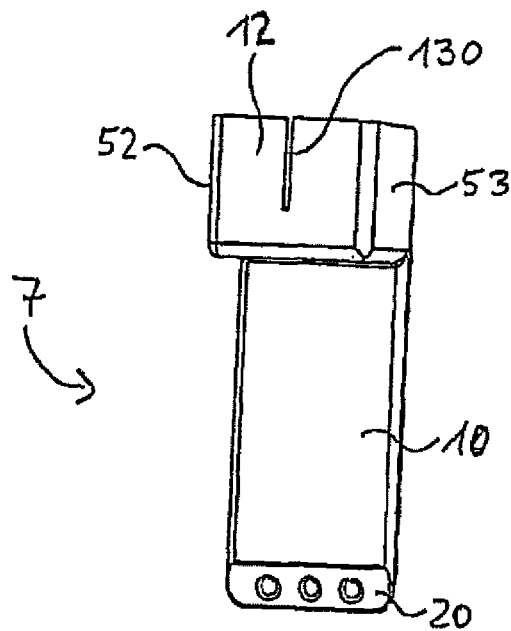

FIG. 13 shows an advantageous embodiment of a wall element 7, in which the upper partition wall portion 12 comprises an opening 130. For example, the opening 130 can be formed as a slot. The slot may run from the upper edge of the upper partition wall portion 12 as far as a lower region of the upper partition wall portion 12. An opening, whether round, slot-shaped or otherwise shaped, may also be provided, said opening starting below the upper edge of the upper partition wall portion 12. Of course, a plurality of openings may also be provided, for example of a similar shape to the openings 57, 58, 59 in the lower partition wall portion 10. A defined flow of liquid electrolyte over the wall element 7 is permitted even earlier, that is to say with a lower electrolyte level, as a result of the opening 130 in the upper partition wall portion 12.

FIG. 14 shows an advantageous embodiment of a wall element 7, which comprises valve flaps 140, 141, 142 at the openings 57, 58, 59, respectively. The valve flaps 140, 141, 142 are formed in the manner of a check valve. The valve flaps 140, 141, 142 open with a flow of electrolyte from the volume 22 into the volume 25 through the openings 57, 58, 59, and the valve flaps 140, 141, 142 close with a flow in the opposite direction. When the valve flaps 140, 141, 142 are closed, electrolyte can reach the volumes 22, 23 by flowing over the upper edge 24 of the upper partition wall portion 12, or through the opening 130 explained with reference to FIG. 13.

Alternatively or additionally, valve flaps and respective openings may also be provided at other points of the wall element 7, for example in the lower partition wall portion 10, in the central partition wall portion 11 or in side walls 50, 51, 52, 53, more specifically in one or more side walls.

The valve flaps may also act in the reverse direction, that is to say they may be arranged on the side of the wall element 7 directed toward the volumes 22, 23. In this case, the valve flaps allow liquid electrolyte to flow into the volumes 22, 23 through the communicating connection 21 provided in the lower region of the volumes, but not out from the volumes 22, 23 in the opposite direction. The electrolyte then flows out from the volumes 22, 23 via the upper edge 24 of the upper partition wall portion 12 or an opening 130, as described with reference to FIG. 13.

The lower volume 23, which, in accordance with the previously described embodiments of the wall element 7, is formed in the manner of a through-duct with an approximately rectangular cross section, may also be of any other shape, in particular with diameters and cross sections different from the cross section that is formed by the upper partition wall element 12 and the side walls 52, 53. A tubular through-duct 150 for example can thus connect at the bottom to the central partition wall portion 11, as illustrated in FIG. 15. The tubular through-duct 150 ends with an opening 151, which forms the communicating connection 21 between the volumes. The tubular through-duct 150 may also comprise further openings, possibly also radial openings provided in a wall.

FIG. 16 shows an advantageous embodiment of a rechargeable battery 1, which corresponds to the embodiment according to FIG. 2 apart from the specific features mentioned hereinafter. The wall element 7 previously described as being in one piece is formed in a number of parts in accordance with FIG. 16, for example as an upper partition wall part 161 and as a lower partition wall part 160. The lower wall part 160 comprises the lower partition wall portion 10 and, where necessary, the insertion chamfer 20. Here, the lower partition wall part 160 is arranged fixedly in the battery housing 2, and for example is produced in one piece with the battery housing 2 during the production process thereof. The upper partition wall part 161 comprises the previously described upper partition wall portion 12 and the central partition wall portion 11. The upper partition wall part 161 is formed as an attachable part, which is fitted from above onto the lower partition wall part 160. For this purpose, the upper partition wall part 161 comprises snap-in elements 162, by means of which the upper partition wall part 161 can be fitted onto the lower partition wall part 160 in the manner of a snap-fit connection. The upper partition wall part 161 is advantageously only fitted once the electrodes 8 and separators 9 have been attached in the battery housing 2. The snap-in elements 162 may alternatively also be provided on the lower partition wall part 160.

FIG. 17 shows a rechargeable battery 1 in an illustration comparable to FIG. 2. In accordance with an advantageous embodiment, the overall height $H_W$ of the wall element 7, that is to say the greatest longitudinal extension thereof, has values advantageous with respect to the overall height $H_G$ of the battery housing 2 (without cover part 13). In a first advantageous embodiment, the ratio of $H_W$ to $H_G$ lies in the range from 40 to 80%. In a second advantageous embodiment, the ratio of $H_W$ to $H_G$ lies in the range from 60 to 80%, and in a third advantageous embodiment the ratio of $H_W$ to $H_G$ lies in the range from 70 to 78%. A particularly high level of efficiency when mixing the electrolyte by means of the wall element 7 can thus be achieved. A further advantage is that dirt particles from the base of the battery housing 2, such as lead particles, are prevented from being stirred up.

The wall element 7 can be arranged in the battery housing 2 in such a way that the lower partition wall portion 10 runs transversely, that is to say for example approximately perpendicularly, with respect to the longitudinal extent of the electrodes 8, as considered in a view from above, that is to say from the cover part 13. This can be seen clearly for example in FIG. 2 in conjunction with FIG. 1. An advantageous alternative lies in the fact that the wall element 7 is arranged in such a way as is illustrated in FIG. 18. In this case, the lower partition wall portion 10 runs parallel to the electrodes 8. The wall element 7 can be arranged for example between an electrode 8, which is provided with a separator 9, and a side wall 4, 5 or an intermediate wall 6. By way of example, FIG. 18 shows the arrangement of a wall element 7 between an electrode 8 provided with a separator 9 and the right-hand side wall 5 of the battery housing 2. This arrangement is to be provided advantageously in particular in rechargeable batteries for commercial vehicles (CV rechargeable batteries), since, with such rechargeable batteries, the electrodes 8 are not arranged transversely with respect to the longitudinal direction, that is to say parallel to the side walls 4, 5, but in the longitudinal direction of the battery housing 2, and therefore approximately perpendicularly with respect to the side walls 4, 5.

FIG. 19 shows an advantageous embodiment of a wall element 7, which is narrower than the width of a cell cavity 3. In order to fix the wall element 7, a space-filling element 190 for example arranged beside the side wall 53 is provided. The space-filling element 190 may also be provided to the left of the wall element 7, that is to say adjacent to the left-hand side wall 52. A space-filling element may also be provided on each side of the wall element 7, that is to say to the left and to the right. FIG. 20 shows the arrangement according to FIG. 19 in a view from above.

FIG. 21 shows an advantageous embodiment of a wall element 7, in which the lower partition wall portion 10 is narrower than the upper partition wall portion 12. The distance between the side walls 52, 53 is accordingly greater than between the side walls 50, 51. FIG. 22 shows the arrangement according to FIG. 21 from above. As can be seen, protruding volume regions 220, 221 of the storage space 23 are formed by the greater wall width in the upper region of the wall element 7.

FIGS. 23 to 26 show an advantageous embodiment of a wall element 7, in which the through-duct 22 is determined by two lower partition wall portions 10, 230 of unequal length. For example, a left-hand lower partition wall portion 10 and a comparatively shorter right-hand lower partition wall portion 230 can be provided. A central wall 232 may be provided between the lower partition wall portions 10, 230. The central wall 232 may also have one or more openings or can be omitted completely. In FIG. 23, which shows a front view of the wall element 7, the left-hand lower partition wall portion 10 and the right-hand lower partition wall portion 230 are formed with approximately the same width. The widths of the lower partition wall portions arranged side by side may also be different. Two perpendicular through-ducts for the electrolyte are formed by the two lower partition wall portions. Besides the two through-ducts illustrated, further through-ducts may also be provided as a result of the provision of a plurality of lower partition wall portions of equal or unequal length arranged side by side. FIG. 24 shows a view of the wall element from above. FIG. 25 shows a lateral sectional illustration through the wall element 7 in line with the left-hand lower partition wall portion 10. FIG. 26 shows a lateral section through the wall element 7 in line with the right-hand lower partition wall portion 231.

In the upper region, that is to say above the left-hand lower partition wall portion 10 and the right-hand lower partition wall portion 231, the storage space 23 already mentioned in the introduction is located and is formed as a common storage space for both through-ducts. The embodiment according to FIGS. 23 to 26 has the advantage that direct mixing of thin electrolyte from the upper region with thick electrolyte from the lower region is enabled. In this case, electrolyte can selectively flow downwardly back into the storage space 23 through the communicating connection 21 or over the upper edge of the wall element 12 into the volume 25.

FIGS. 27 to 30 show an advantageous embodiment of a wall element 7, which corresponds substantially to the wall element in FIGS. 23 to 26. In this case, FIG. 27 again shows a front view, FIG. 28 shows a view from above, and FIGS. 29 and 30 show the two sectional illustrations already explained with reference to FIGS. 25 and 26 in different planes. In contrast to the embodiment according to FIGS. 23 to 26, a central web 270 is provided with the embodiment in FIGS. 27 to 30 and can be formed for example in the extension of the central wall 232 and divides the storage space 23 into two sub-chambers. The central web 270 may extend over the full height of the upper partition wall element 12, or, as illustrated in FIG. 27, only over part of the height. By means of the central web 270, the electrolyte can be mixed in accordance with the filling level of the storage space 23 and/or in accordance with the angle of inclination of the respective cell cavity 3. The previously described effect of improved mixing of thin electrolyte from the upper region of the rechargeable battery with thick electrolyte from the lower region can thus be optimized further. As illustrated in FIG. 27 for example, the central web 270 may run vertically in the extension of the central wall 232.

FIGS. 31 to 34 show an advantageous embodiment of a wall element 7 in illustrations comparable to figures to 30, wherein an inclined central web 310 is provided. For example, it is thus possible to prevent the right-hand part of the storage space 23, which is connected to the short through-duct or the right-hand lower partition wall element 230, from running or sloshing over at an undesirable early moment in time before the left-hand part of the storage space 23, which is connected to the long through-duct, which has a higher flow resistance than the short through-duct, is filled accordingly. Due to such an inclined central web 310, different flow conditions can thus be compensated for by riser ducts of different lengths.

A further embodiment of the central web consists in the fact that it is not directly attached to the central wall 232, as illustrated in FIGS. 27 and 31, but is offset slightly, for example to the right in a region above the right-hand lower partition wall 230, and a connecting wall running horizontally for example connects the central web to the central wall 232.

It should also be mentioned that the terms "central web" and "central wall" are not to be understood in such a way that the corresponding elements have to be arranged exactly in the center. An off-center arrangement is also included.

FIGS. 35 to 38 show an advantageous embodiment of the wall element 7, which corresponds substantially to the embodiment according to FIGS. 31 to 34. In contrast thereto, the inclined central web 310 is not led as far as the central wall 232, but ends at a specific distance therefrom or has at least one specific opening 351 in the transition to the central wall 232. This has the advantage that the storage space 23 empties slowly in idle phases into one of the two perpendicular through-ducts, wherein it is particularly advantageous if said through-duct is a through-duct with a communicating connection in the upper region of the wall element 7, such as the through-duct that is formed in FIG. 35 behind the right-hand lower partition wall portion 230. The opening 351 can be located at the lower end of the central web 310 as illustrated, or may also extend at other points or over the total height of the central web 310.

FIGS. 39 to 42 show advantageous embodiments of the wall element 7 in lateral sectional views, wherein differences are provided in the embodiment of the central partition wall portion 11. FIG. 35 again shows in a highly schematic manner the embodiment according to FIG. 5 with a horizontally running central partition wall portion 11. According to FIG. 36, a central partition wall portion 360 is provided, which runs at an incline in such a way that the upper partition wall portion 12 overlaps with the lower partition wall portion 10. FIG. 37 shows an embodiment of a central partition wall portion 370, which is likewise arranged in an inclined manner, but is illustrated in the opposite direction compared to FIG. 36. FIG. 38 shows a central partition wall portion 380, 381, 382 divided into three portions, wherein, starting from the lower partition wall portion 10, a first horizontal central partition wall portion 380 adjoins first, then an inclined central partition wall portion 381, and then a second horizontal central partition wall portion 382. The upper partition wall portion 12 then adjoins the second horizontal central partition wall portion 382. In the embodiments according to FIG. 36 and FIG. 38, a confined volume is formed by the central partition wall portion 360 or 380, 381, 382 respectively, in which electrolyte is held. A discharge of the electrolyte from the confined volume is only produced by a corresponding accelerating movement of the rechargeable battery 1 or by inclination of the rechargeable battery 1, as occurs for example as a vehicle is driven.

FIG. 43 shows an advantageous embodiment of a wall element 7, in which a central partition wall portion 390 is provided, which is arranged in an inclined manner on the wall element 7 in plan view.

Figures 39, 40, 41, 42:
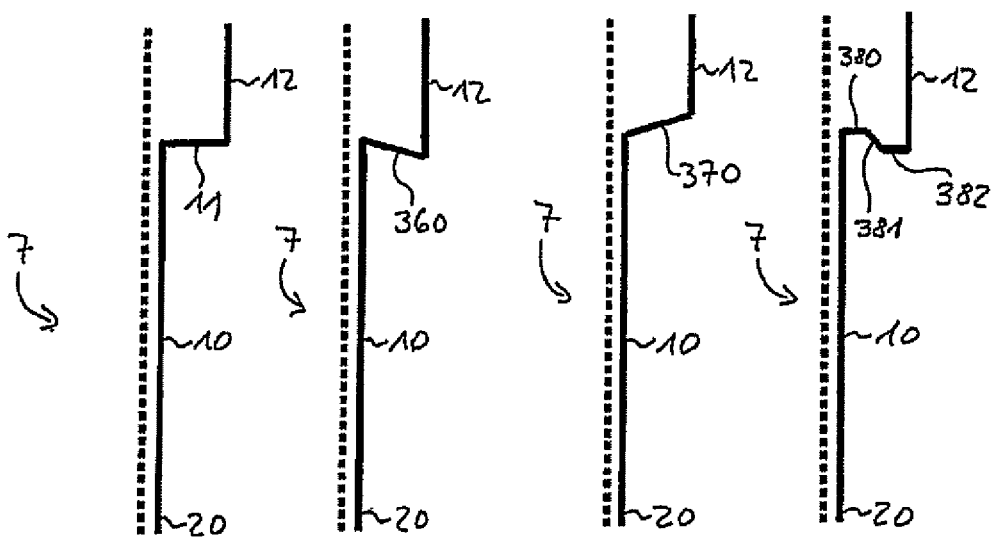

FIGS. 44 to 46 show an advantageous embodiment of a wall element 7, which is designed in a manner comparative to the wall element according to FIGS. 23 to 26, wherein, in contrast thereto however, separate central partition wall portions 11, 410 are provided in the left-hand and right-hand through-duct and are arranged at different heights with respect to the base of the rechargeable battery 1. Respective upper partition wall portions 12, 40 extending over different lengths in the vertical direction are thus also provided. FIG. 40 again shows a front view of the wall element 7, whilst FIGS. 41 and 42 show lateral sections, again through the left-hand through-duct (FIG. 45) and again through the right-hand through-duct (FIG. 46).

FIGS. 47 to 49 show an advantageous embodiment of the wall element 7, in which, similarly to the situation illustrated in FIG. 44, a step is provided in the base of the storage space 23 as a result of the provision of central partition wall portions 11, 401 arranged at different heights. In contrast to FIG. 44, a central web 430 is provided, which corresponds in terms of embodiment and function to one of the central webs 270, 310, 350 explained with reference to FIGS. 27 to 38.

The described advantageous embodiments and individual features of the wall element can be combined with one another as desired.

The invention claimed is:

1. A rechargeable battery having a battery housing, which has a cell cavity or a plurality of cell cavities separated from one another by partition walls, wherein a positive and a negative electrode, separated from one another by at least one separator, and liquid electrolyte is provided in one or more of the cell cavities, and a wall element is also provided in one or more of the cell cavities, said wall element dividing the respective cell cavity into at least two volumes communicating with one another in the manner of communicating pipes, wherein, in the lower region of the volumes, a communicating connection is provided between the volumes for the liquid electrolyte, and, in the upper region of the volumes, a pressure compensation connection is provided between the volumes in order to ensure an equal air pressure in the volumes communicating with one another,
wherein the wall element is formed as a separate component that can be inserted into a cell cavity, and wherein a wall portion located at a lower end section of the wall element has a region formed as an insertion chamfer, in which a wall portion of the wall element arranged on the end located at the lower end section runs at an incline with respect to the electrodes and separators of the cell cavity,
characterized in that the wall element comprises an integrally formed assembly aid element in the upper region, said assembly aid element being in the form of an inwardly arranged wall oriented approximately in the center of the wall element along a longitudinal axis of the wall element.

2. The rechargeable battery as claimed in claim 1, characterized in that one, more or all openings are formed as apertures in the wall element, which are surrounded by the material of the wall element.

3. The rechargeable battery as claimed in claim 1, characterized in that the wall portion has a straight or convex contour.

4. The rechargeable battery as claimed in claim 1, characterized in that the wall element comprises a lower partition wall portion and an upper partition wall portion and also a substantially horizontally running central partition wall portion, which tightly connects the lower petition wall portion to the upper partition wall portion, wherein, when the wall element is inserted into a cell cavity, the upper, the central and the lower partition wall portion form a partition wall between the two volumes communicating with one another.

5. The rechargeable battery as claimed in claim 1, characterized in that the wall element can be fastened releasably in a cell cavity by means of a plug-in fastening.

6. The rechargeable battery as claimed in claim 1, characterized in that at least one wall region of the wall element, which is intended to bear against a delimiting wall of the cell cavity, comprises an integrally formed sealing lip for sealing between the two volumes communicating with one another.

7. The rechargeable battery as claimed in claim 1, characterized in that all edges of the wall element sliding along the separators during insertion of the wall element are rounded.

8. The rechargeable battery as claimed in claim 1, characterized in that the wall element comprises at least one partition wall portion, which extends from a delimiting wall of the cell cavity to an opposed delimiting wall of the cell cavity and forms a partition wall between the two volumes communicating with one another, and the wall element comprises side walls, which, when the wall element is inserted, bear in a planar manner against the delimiting walls of the cell cavity.

9. The rechargeable battery as claimed in claim 8, characterized in that the longitudinal extension of the side walls in the longitudinal direction of the wall element reduces away from the partition wall portion.

10. The rechargeable battery as claimed in claim 1, characterized in that the wall element comprises at least one petition wall portion, which forms a partition wall between the two volumes communicating with one another, and the wall element comprises, at least in the lower region, at least one integrally formed spacer element, which, when the wall element is inserted, is arranged between the partition wall portion and a delimiting wall of the cell cavity opposite the partition wall portion, wherein, when the wall element is inserted, the partition wall portion is held by means of the spacer element at a distance from the opposed delimiting wall of the cell cavity against the force of separators protruding beyond the electrodes, said force acting on the partition wall portion.

11. A wall element for a rechargeable battery as claimed in claim 1.

12. The wall element as claimed in claim 11, characterized in that one or more openings are provided in the lower region of the wall element, allowing for electrolyte to flow back and forth through said openings between the two volumes communicating with one another.

13. The wall element as claimed in claim 11, characterized in that the wall portion comprising the insertion chamfer has one or more openings, through which electrolyte can flow back and forth between the two volumes communicating with one another.

* * * * *